Patented Mar. 14, 1944

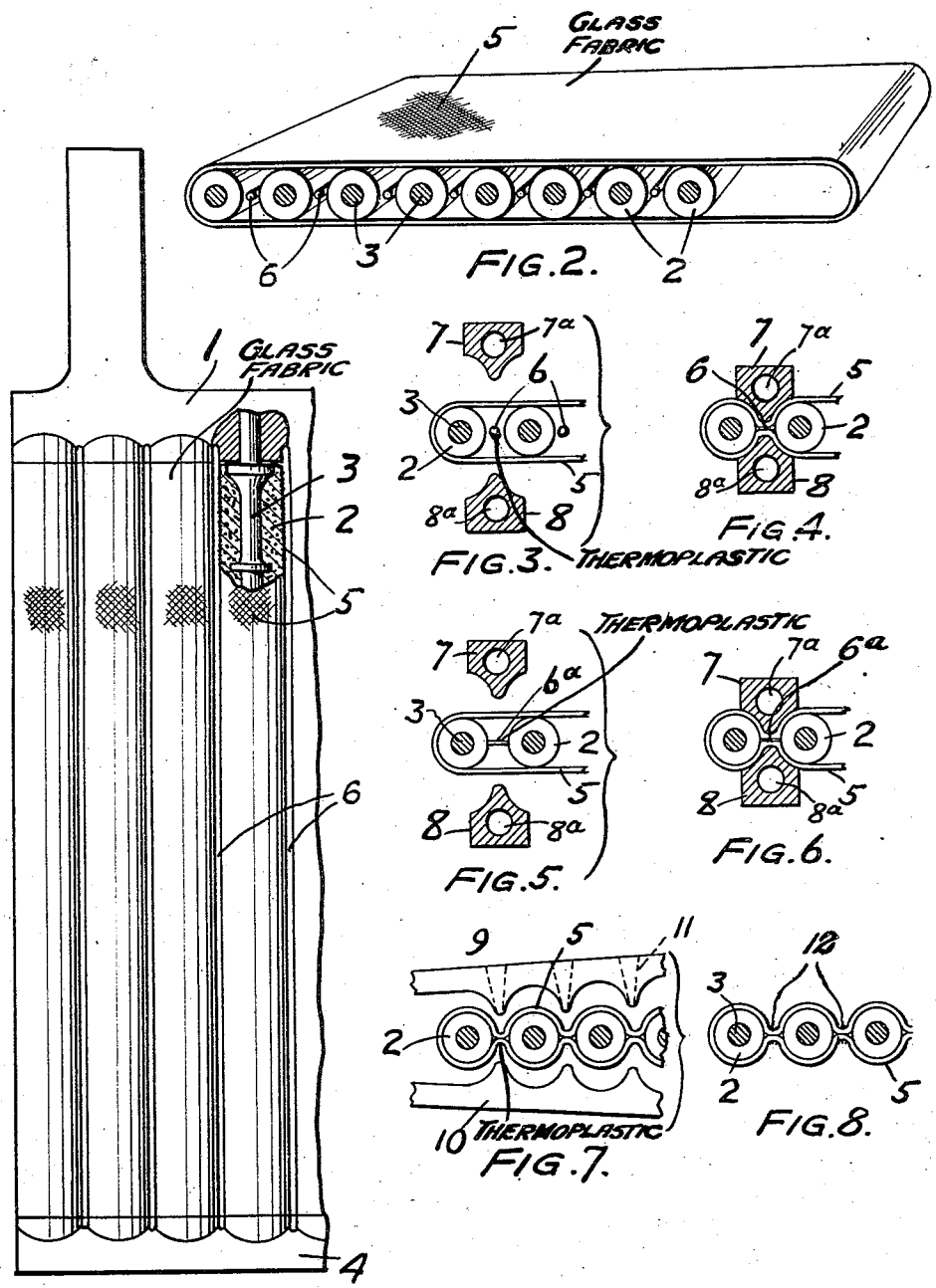

2,343,970

UNITED STATES PATENT OFFICE 2,343,970

PLATE FOR STORAGE BATTERIES AND METHOD FOR PRODUCING THE SAME

Charles D. Galloway, Wyndmoor, Pa., assignor to The Electric Storage Battery Company, Philadelphia, Pa., a corporation of New Jersey Application October 25, 1941, Serial No. 416,506

9 Claims. (Cl. 136—55)

This invention relates to improved plates for storage batteries and an improved, relatively inexpensive method for producing the same.

More specifically, this invention relates to improvements in storage battery plates of the type described in my co-pending application, Serial No. 346,459, filed July 20, 1940, now Patent No. 2,266,546, issued December 16, 1941, and has for its primary object the provision of an improved plate of this character and an improved method for manufacturing such plates at a low cost.

In accordance with the invention described in my aforesaid patent, there is provided a storage battery plate or electrode comprising a group of separate pencils of active material having centrally positioned spines. These pencils are arranged in a row and the individual spines are connected to a top bar to form a platelike structure. A sleeve of textile material is provided around the group of pencils, and the opposite faces of the sleeve are secured between the individual pencils to provide tube-like sheaths for enclosing the separate pencils. A bottom bar is then secured to the lower end of the pencils to complete the plate.

It is the object of the present invention to provide an improved construction of the foregoing type in which the opposite faces of the sleeve of textile material are secured between the pencils in an improved manner so that the tube-like sheaths formed are unaffected by the growth of the pencils in use and the active material is held in effective electrical contact with the spines.

It is a further object of this invention to provide a simple, expeditious and relatively inexpensive method for securing the sleeve so as to form the tube-like sheaths for the pencils.

Generally stated, this invention consists in surrounding a plate consisting of a row of pencils of active material joined to a top and bottom bar, with a sleeve of knitted or woven acid-resisting fabric such as a glass or a vinyl resin fabric, and securing the opposite faces of said sleeve between the individual pencils with a solid thermoplastic resin, for example, polymerized methyl methacrylate, known to the trade as "Lucite," or polymerized vinylidene chloride, known to the trade as "Saran," so as to form connected tube-like sheaths, each enclosing an individual pencil. Thereafter, the plate is completed by securing a bottom bar to the pencils.

The invention also comprises the method of making storage battery plates or electrodes which consists in surrounding a group of pencils of active material with a sleeve of knitted or woven fabric, conforming the fabric to the individual pencils by drawing it in between them, and cementing the fabric between the pencils with a stripe of solid thermoplastic vinyl resin to form tube-like sheaths enclosing the individual pencils.

Further objects and advantages of this invention will appear as the following detail description proceeds, and the features of novelty which characterize this invention will be set forth in the claims appended to and forming a part of this specification.

For a more complete understanding of this invention, reference should be had to the accompanying drawings in which:

Fig. 1 is an elevational view, with parts broken away, illustrating a portion of a plate or electrode embodying features of the invention;

Fig. 2 is a perspective view illustrating a step in one method of manufacture of such a plate;

Fig. 3 is a sectional view illustrating another step in that method;

Fig. 4 is a similar view illustrating another step in that method of manufacture;

Figs. 5 and 6 are views similar to Figs. 3 and 4 and illustrating a modified method of manufacture; and Figs. 7 and 8 are similar views illustrating a further modification in the method of manufacture.

Referring to the drawing, and more particularly to Fig. 1, it will be observed that the battery plate or electrode comprises a top bar 1 and a bottom bar 4 between which are supported a plurality of pencils of active material. These pencils are arranged in a row as shown and each consists of a spine 3 upon which is pasted the active material 2. As shown in Fig. 1, the pencils are cylindrical in shape but it is to be understood that any other suitable or desired shape could be used.

Surrounding the group of pencils so as to maintain the active material tightly against the spines 3 is a sleeve of woven or knitted acid-resisting fabric. In the specific embodiment of this invention illustrated, the sleeve 5 is knitted from glass thread. However, it is to be understood that a sleeve of any other suitable acid-resisting fabric may be employed which is mechanically strong and has the necessary mechanical and chemical properties to withstand growth of the active material 2 during use of the plate. For example, the sleeve 5 may consist of a knitted or woven fabric made from a vinyl resin thread as described in Patent 2,176,428, to Kershaw, issued October 17, 1939.

In accordance with this invention, the opposite faces of the sleeve are drawn down between the pencils of the plate, and a strip 6 of solid thermoplastic resinous material such as an acrylic resin, particularly "Lucite," or a vinylidene resin, particularly "Saran," is provided between the confronting portions of the sleeve so as to secure them together and enclose each individual pencil in a tube-like sheath.

In Figs. 2, 3 and 4 there is illustrated one method for making the improved plate of this invention described above. As illustrated in these figures, the sleeve of fabric 5, in this instance knitted glass fabric, is arranged over the group of pencils 2 which are secured to the top bar only at this stage of the manufacturing operation. Between each pencil there is inserted a strip of solid cementing material 6 of the character described above. My means of tools 7 and 8 acting on opposite faces of the sleeve, the latter is made to conform to the contour of the pencils of active material as indicated in Fig. 4. Because of the inter-looping and smooth character of threads or strands of the knitted fabric, it is well adapted to be conformed to the contour of the individual pencils. As shown in Figs. 3 and 4, the tools 7 and 8 are provided with suitable heating means 7a and 8a, which may be either in the form of a steam heating coil or electrical conductor, and, at the same time that the opposite faces of the sleeve are being brought into confronting relation between the pencils or shortly thereafter, the tools 7 and 8 are heated. This heat causes the solid thermoplastic material 6 to soften, and, by the application of additional pressure together with further heating, the confronting faces of the sleeve become embedded in this material. After the material has been softened, the heat is removed; and, with the pressure still maintained, the tools 7 and 8 are permitted to cool, thereby allowing the material 6 to set. After the material has cooled sufficiently, the tools are removed and the operation is repeated between the next succeeding pair of pencils. Thus there is formed about each individual pencil a tube-like sheath of fabric which serves to maintain the active material in good electrical contact with the spines 3. A sleeve having its opposite faces secured in accordance with this method has been found to maintain its form even though the joint provided between the opposite faces is subjected to rather high stresses due to the growth of the individual pencils during the use of the plate.

After the cementing operation, the bottom bar 4 is secured to the lower end of the spines, the ends of the tube-like sheaths being embedded in the material of the bottom bar.

In Figs. 5 and 6, I have shown a slightly modified method of manufacturing the improved plate of this invention. The essential difference between this method and that already described is that the strip 6a of thermoplastic cementing material is secured in place between the pencils prior to the application of sleeve 5. In all other respects, the method is as described above.

A further modified method of making the improved plate of this invention is shown in Figs. 7 and 8. In accordance with this form of my invention, a sleeve of fabric of the aforementioned character is arranged around the group of pencils. This fabric is then drawn around the separate pencils until the opposite faces are brought into contact. A corrugated or flutted jig having relatively movable portions 9 and 10 may be employed for this operation. After the faces of the sleeve are brought into contact, the contacting portions are fastened together by a suitable plastic cement, such as a vinyl resin dissolved in a suitable solvent, such as mesityl oxide. This solution is forced or extruded through the openings 11 provided in the jig. After the solution has been applied, it is permitted to dry while the sleeve is held down by the jig so as to provide a cemented strip 12 as shown in Fig. 8. In this modified form of my invention, the movable parts 9 and 10 of the jig are so related that the sleeve will be progressively brought down between the separate pencils. A knitted fabric, by reason of its interlooping threads and strands, is stretchable and therefore well adapted to conform to the contour of a group of pencils in a single operation such as has been described.

It has been found that the improved plate produced in accordance with any of the aforedescribed methods tends to retain its shape during use; and, furthermore, the securing means between the contacting portions of the sleeve 5 does not break loose even though subjected to rather large stresses due to the growth of the pencils.

Moreover, it has also been found that the described use of strips of cement imparts desirable properties to the plates and battery in which they are used in respect to durability and successful operation; for example the bond between the individual pencils of active material and the confronting faces of the sleeve is continuous, so that stress due to growth of the active material is distributed along the length of the strip as distinguished from being localized at one or more spaced points of attachment, thus separation of the confronting faces of the fabric such as might permit the escape of particles of active material and consequent short circuiting or bridging is opposed. Again, where sewing with thread and needle is employed, sometimes the needle cuts or weakens the thread, and when that happens the seam opens and detached particles of active material may escape, producing the results above indicated. Furthermore, in the case of a knitted fabric a weakened or cut thread forms a hole or may start a so called run greatly impairing the efficiency of the battery and permitting of the escape of detached particles of active material into the electrolyte. In the matter of manufacture the strips can be applied at a single operation as contrasted with a progressive operation like sewing.

While there has been described particular modifications of this invention, it is apparent that other modifications may be made, and it is intended in the appended claims to cover all such modifications as are within the true spirit and scope of this invention.

I claim:

1. A storage battery plate comprising, top and bottom bars, a group of separate pencils of active material having spines connected with said bars and arranged in a row, a sleeve of knitted acid-resisting fabric surrounding said row of pencils and conforming to the contour of the individual pencils, and a strip of thermoplastic cement between said individual pencils and the confronting faces of said fabric for securing said confronting faces to form tube-like sheaths enclosing the individual pencils of said group.

2. A storage battery plate or electrode comprising, a top bar and a bottom bar, a group of separate pencils of active material arranged in a row between said top and bottom bar, each of said pencils including a spine secured at its ends to said top and bottom bar, a sleeve of knitted glass fabric surrounding said row of pencils, the opposite faces of said sleeve being drawn down between the individual pencils of said group so as to have confronting faces, and a strip of vinyl resin between said faces and adapted to secure said faces together to form a tube-like sheath for enclosing each individual pencil of said group.

3. The method of manufacturing storage battery plates of the type having a group of pencils of active material arranged in a row and surrounded by a fabric sheath which comprises, surrounding a group of pencils with a sleeve of acid-resisting fabric, drawing the opposite faces of said fabric down between the separate pencils of said group, and cementing the contacting portions of said sleeve between said pencils with an acid-resisting thermoplastic resinous material.

4. The method of manufacturing storage battery plates of the type described which consists in, surrounding a group of pencils of active material with a glass textile fabric sleeve, interposing strips of thermoplastic cement between the respective pencils and inside of said sleeve, forming the fabric so that opposite faces thereof are brought into contact with said cement so as to provide individual tube-like sheaths for said pencils, and applying heat and pressure to said cement to intimately bond the adjacent portions of said opposite walls of said sleeve.

5. In the manufacture of storage battery plates or electrodes of the type described, the steps which consist in, mounting strips of thermoplastic cement between the respective pencils of a group of pencils of active material, applying a sleeve of knitted fabric around the group of pencils and the strips of cement, drawing the knitted fabric down between the individual pencils so that it conforms to the contour of said pencils and the opposite faces of said sleeve are brought into contact with said cement, and uniting said drawn-down portions of said sleeve by the application of heat and pressure to said cement.

6. The method of manufacturing storage battery plates of the type described, which includes the steps of, mounting a sleeve of knitted glass fabric around a group of pencils, conforming the fabric to the shape of said pencils, and cementing contiguous portions of said fabric so as to provide tube-like sheaths for said individual pencils.

7. The method of manufacturing storage battery plates of the type described, which consists in, applying a sleeve of knitted glass fabric around a group of pencils of active material, inserting a strip of vinyl resin between the individual pencils of said group, conforming said sleeve to the shape of said pencils, and applying heat and pressure to the portions of said sleeve in contact with said vinyl resin to cement said portions together and form a tube-like sheath for the individual pencils of said group.

8. The method of manufacturing a battery plate of the type having a group of pencils of active material arranged in a row, each of said pencils being enclosed in an acid-resisting knitted fabric sheath which comprises, surrounding said group of pencils with a knitted acid-resisting fabric sleeve, conforming said sleeve by the application of pressure to the contour of said individual pencils, and cementing the contiguous portions of said sleeve with a vinyl resin by the application of heat and pressure.

9. The method of manufacturing storage battery plate of the type having a group of pencils of active material arranged in a row, each of said pencils being enclosed in a sheath of knitted glass wool fabric which comprises, surrounding said group of pencils with a sleeve of knitted glass fabric, providing a strip of vinyl resin between the individual pencils of said group, pressing the opposite faces of said sleeve down between said pencils and into contact with said vinyl resin, applying heat and pressure to the portions of said sleeve in contact with said vinyl resin so as to cause said resin to flow and commingle with the contiguous portions of said sleeve, and removing said source of heat while said pressure is still applied to permit said vinyl resin to cool and set so as to securely unite the adjacent faces of said sleeve and form individual connected sheaths for said pencils of active material.

CHARLES D. GALLOWAY.